(12) United States Patent
Liu et al.

(10) Patent No.: US 11,536,962 B2
(45) Date of Patent: Dec. 27, 2022

(54) OPTICAL SYSTEM AND NEAR-EYE DISPLAY DEVICE

(71) Applicants: Beijing BOE Optoelectronics Technology Co., Ltd., Beijing (CN); Beijing BOE Technology Development Co., Ltd., Beijing (CN)

(72) Inventors: Yali Liu, Beijing (CN); Chenru Wang, Beijing (CN); Zhiyu Sun, Beijing (CN); Ruijun Dong, Beijing (CN); Ke Li, Beijing (CN); Hao Zhang, Beijing (CN); Lili Chen, Beijing (CN)

(73) Assignees: Beijing BOE Optoelectronics Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 189 days.

(21) Appl. No.: 16/954,937

(22) PCT Filed: Dec. 24, 2019

(86) PCT No.: PCT/CN2019/127729
§ 371 (c)(1),
(2) Date: Jun. 17, 2020

(87) PCT Pub. No.: WO2020/168817
PCT Pub. Date: Aug. 27, 2020

(65) Prior Publication Data
US 2021/0239981 A1    Aug. 5, 2021

(30) Foreign Application Priority Data

Feb. 22, 2019  (CN) .......................... 201910133081.5

(51) Int. Cl.
*G02B 27/01* (2006.01)
*F21V 8/00* (2006.01)
(Continued)

(52) U.S. Cl.
CPC ....... *G02B 27/0172* (2013.01); *G02B 6/0031* (2013.01); *G02B 9/16* (2013.01); *G02B 25/001* (2013.01); *G02B 2027/011* (2013.01)

(58) Field of Classification Search
CPC .................................................. G02B 27/0176
See application file for complete search history.

(56) References Cited

U.S. PATENT DOCUMENTS 10,108,015 B2  10/2018  Komatsu et al.
10,534,172 B2   1/2020  Tanaka et al.
(Continued)

FOREIGN PATENT DOCUMENTS

CN    104216120 A    12/2014
CN    204964881 U     1/2016
(Continued)

OTHER PUBLICATIONS

Dec. 16, 2020—(CN) First Office Action Appn 201910133081.5 with English Translation.

*Primary Examiner* — Edmond C Lau
(74) *Attorney, Agent, or Firm* — Banner & Witcoff, Ltd.

(57) ABSTRACT

The present disclosure provides an optical system and a near-eye display device. The optical system includes an optical waveguide and an eyepiece system. The eyepiece system is on a light incident side of the optical waveguide, and a light exit side of the eyepiece system is opposite to the light incident side of the optical waveguide so that light exited from the eyepiece system is incident on the optical waveguide. The eyepiece system includes a lens group which includes a first lens, a second lens and a third lens which are sequentially arranged in a direction parallel to the optical axis of the lens group; a side of the first lens away from the second lens is the light exit side of the eyepiece
(Continued)

system, each of the first lens and the third lens has a positive focal power; and the second lens has a negative focal power.

20 Claims, 8 Drawing Sheets

(51) Int. Cl.
*G02B 9/16* (2006.01)
*G02B 25/00* (2006.01)

(56) References Cited

U.S. PATENT DOCUMENTS

| | | |
|---|---|---|
| 2016/0282623 A1 | 9/2016 | Miyao et al. |
| 2017/0248769 A1 | 8/2017 | Stamenov |
| 2019/0187354 A1* | 6/2019 | Kuo .................. G02B 9/34 |
| 2020/0150405 A1* | 5/2020 | Bates ................ G02B 13/16 |

FOREIGN PATENT DOCUMENTS

| | | |
|---|---|---|
| CN | 105929545 A | 9/2016 |
| CN | 206020813 U | 3/2017 |
| CN | 106796348 A | 5/2017 |
| CN | 207516641 U | 6/2018 |
| CN | 106680989 B | 12/2018 |
| JP | H09197298 A | 7/1997 |
| WO | 2001095027 A2 | 12/2001 |
| WO | 2015008530 A1 | 1/2015 |

* cited by examiner

OPTICAL SYSTEM AND NEAR-EYE DISPLAY DEVICE

This application is a U.S. National Phase Entry of International Application No. PCT/CN2019/127729 filed on Dec. 24, 2019, designating the United States of America and claiming priority to Chinese Patent Application No. 201910133081.5 filed on Feb. 22, 2019. The present application claims priority to and the benefit of the above-identified applications and the above-identified applications are incorporated by reference herein in their entirety.

TECHNICAL FIELD

At least one embodiment of the present disclosure relates to an optical system and a near-eye display device.

BACKGROUND

Augmented reality technology is a technology that integrates real-world information and virtual-world information, and can display the virtual-world information while displaying the real-world information, so that digital-world information and the real-world information are complemented and superposed to present in front of users.

SUMMARY

At least one embodiment of the present disclosure provides an optical system, which includes: an optical waveguide; and an eyepiece system at a light incident side of the optical waveguide. A light exit side of the eyepiece system is opposite to the light incident side of the optical waveguide so that light exited from the eyepiece system is incident on the optical waveguide. The eyepiece system includes a lens group, the lens group includes a first lens, a second lens and a third lens which are sequentially arranged along a direction parallel to an optical axis of the lens group, a side of the first lens away from the second lens is the light exit side of the eyepiece system, each of the first lens and the third lens has a positive focal power, and the second lens has a negative focal power.

For example, the first lens includes a first surface and a second surface which are opposite to each other, the second lens includes a third surface and a fourth surface which are opposite to each other, and the third lens includes a fifth surface and a sixth surface which are opposite to each other, the first surface, the second surface, the third surface, the fourth surface, the fifth surface and the sixth surface are sequentially arranged in the direction parallel to the optical axis, a radius of curvature of the first surface ranges from 5 mm to 50 mm, a radius of curvature of the second surface ranges from −50 mm to 0 mm, a radius of curvature of the third surface ranges from 0 mm to 50 mm, a radius of curvature of the fourth surface ranges from 2 mm to 20 mm, a radius of curvature of the fifth surface ranges from 5 mm to 20 mm, and a radius of curvature of the sixth surface ranges from −5 mm to −20 mm.

For example, a distance from an intersection point where the first surface intersects the optical axis to an intersection point where the sixth surface intersects the optical axis is in a range from 10 mm to 30 mm.

For example, each of the first lens, the second lens and the third lens has a thickness range of 2 mm to 20 mm.

For example, the focal power of the first lens is in a range from 0.01 to 0.2, the focal power of the second lens is in a range from −0.01 to −0.2, and the focal power of the third lens is in a range from 0.05 to 0.3.

For example, an effective focal length of the eyepiece system is in a range from 10 mm to 25 mm.

For example, a contrast ratio at a position where a spatial frequency in a modulation transfer function curve of the eyepiece system is 108 line pairs/mm is not less than 0.05.

For example, an orthographic projection of the lens group on a plane perpendicular to the optical axis has a maximum size in a first direction; in the first direction, a diameter of each lens is in a range from 10 mm to 35 mm; and in a second direction perpendicular to the first direction, a diameter of each lens is in a range from 5 mm to 15 mm, and both the first direction and the second direction are perpendicular to the optical axis.

For example, a maximum field curvature of the eyepiece system is not greater than 0.2 mm in a maximum field of view along the first direction and a maximum field of view along the second direction.

For example, a maximum distortion of the eyepiece system is less than 4% in a maximum field of view along the first direction and a maximum field of view along the second direction.

For example, the maximum field curvature of the eyepiece system is not greater than 0.1 mm in the maximum field of view along the first direction.

For example, the maximum field of view of the lens group is 8.66° along the first direction; the maximum field of view of the lens group is 15.7° along the second direction.

For example, the optical waveguide includes a main plane, both the light incident side and a light exit side of the optical waveguide are on a same side of the main plane, the optical waveguide includes a reflection array arranged along the second direction, and the optical waveguide is configured to reflect the light incident into the optical waveguide from the light incident side to the light exit side of the optical waveguide, and to make a size of a light beam exited from the optical waveguide in the second direction larger than a size of a light beam excited from the eyepiece system in the second direction.

For example, a material of the first lens is different from that of the second lens.

At least one embodiment of the present disclosure provides a near-eye display device including a display screen and the optical system according to any one of the above embodiments, and the display screen is at a focal plane of a light incident side of the eyepiece system.

For example, the display screen has an image resolution of not less than 5000 PPI.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

Figure 1A:
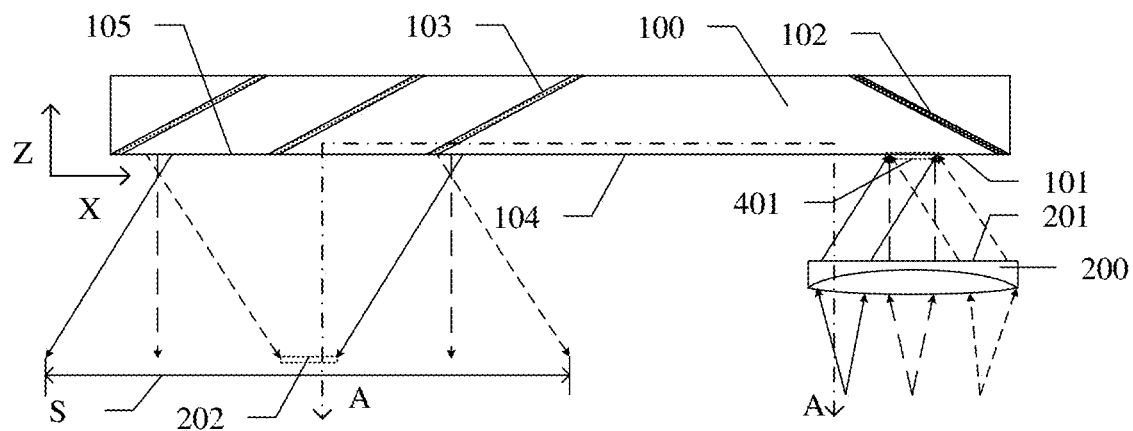
FIG. 1A is a schematic partial cross-sectional view of an optical system according to an embodiment of the present disclosure.

In order to make objects, technical details and advantages of the embodiments of the disclosure apparent, the technical solutions of the embodiments will be described in a clearly and fully understandable way in connection with the drawings related to the embodiments of the disclosure. Apparently, the described embodiments are just a part but not all of the embodiments of the disclosure. Based on the described embodiments herein, those skilled in the art can obtain other embodiment(s), without any inventive work, which should be within the scope of the disclosure.

Unless otherwise defined, all the technical and scientific terms used herein have the same meanings as commonly understood by one of ordinary skill in the art to which the present disclosure belongs. The terms "first," "second," etc., which are used in the description and the claims of the present application for disclosure, are not intended to indicate any sequence, amount or importance, but distinguish various components. The terms "comprise," "comprising," "include," "including," etc., are intended to specify that the elements or the objects stated before these terms encompass the elements or the objects and equivalents thereof listed after these terms, but do not preclude the other elements or objects.

In the research, the inventors of the present application found that a display screen, an eyepiece system and an optical waveguide are arranged in a general display device with an augmented reality display effect. The eyepiece system in a general display device is a combination of a convex lens and a polarizing beam splitter (PBS), and the optical waveguide is an array type reflective optical waveguide. Light emitted by the display screen enters the optical waveguide after passing through the eyepiece system, and the light entering the optical waveguide is propagated in a total reflection manner. The optical waveguide is provided with a row of partial reflection surfaces, and in the case that the light propagating in the total reflection manner reaches the partial reflection surfaces, the reflection surfaces couple part of the light out of the optical waveguide to enter eyes of a user. In the case that the eyepiece system adopts a combination of a convex lens or a reflective concave lens and a polarizing beam splitter (PBS), the polarizing beam splitter is configured to turn a light path. In the case that the display screen is very bright (for example, LCOS), the polarizing beam splitter can meet brightness requirements, but because of the large volume of the polarizing beam splitter, the cost of the eyepiece system is high. In addition, the eyepiece system in the display device can also use one convex lens, at this time, assuming that the screen resolution of the display screen is very high, the eyepiece system cannot clearly present high-resolution images in front of the user due to aberration or other reasons.

A reflection array is disposed in the reflective optical waveguide, and the reflection array is configured to make a size of an image formed by light exited from the light waveguide in a direction (called a first direction) parallel to a line connecting two eyes of a user greater than a size of an image formed by light exited from the eyepiece system in the first direction so as to realize exit pupil expansion. At the same time, in a second direction perpendicular to the first direction, a size of the image formed by the light exited from the eyepiece system is equal to a size of the image formed by the light exited from the optical waveguide, that is, the optical waveguide does not expand the exit pupil in the second direction of the exited light. Generally, it is necessary to adopt an optical multiple structure solution to meet the above image quality requirements of expanding the exit pupil in the first direction and not expanding the exit pupil in the second direction. However, the eyepiece system adopting the optical multiple structure solution needs a special design, that is, it is necessary to optimize the reasonable configuration of various parameters of the eyepiece system, and it also needs a reasonable optimization process.

Embodiments of the present disclosure provide an optical system and a near-eye display device. The optical system includes an optical waveguide and an eyepiece system. The eyepiece system is located at a light incident side of the optical waveguide, and a light exit side of the eyepiece system is opposite to the light incident side of the optical waveguide so that light exited from the eyepiece system is incident on the optical waveguide. The eyepiece system includes a lens group, the lens group includes a first lens, a second lens and a third lens which are sequentially arranged along a direction parallel to an optical axis of the lens group, a side of the first lens away from the second lens is the light exit side of the eyepiece system, each of the first lens and the third lens has a positive focal power, and the second lens has a negative focal power. The eyepiece system disposed in the optical system provided by the embodiments of the disclosure has high light energy utilization rate and small volume, can improve the light efficiency of the optical system, and has a more compact structure.

The optical system and the near-eye display device provided by the embodiments of the present disclosure will be described below with reference to the accompanying drawings.

Figure 1B:
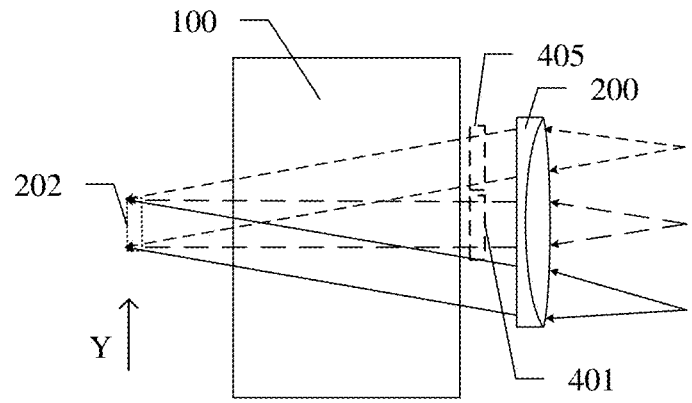
FIG. 1B is a schematic cross-sectional view of the optical system shown in FIG. 1A taken along line AA.
Figure 1C:
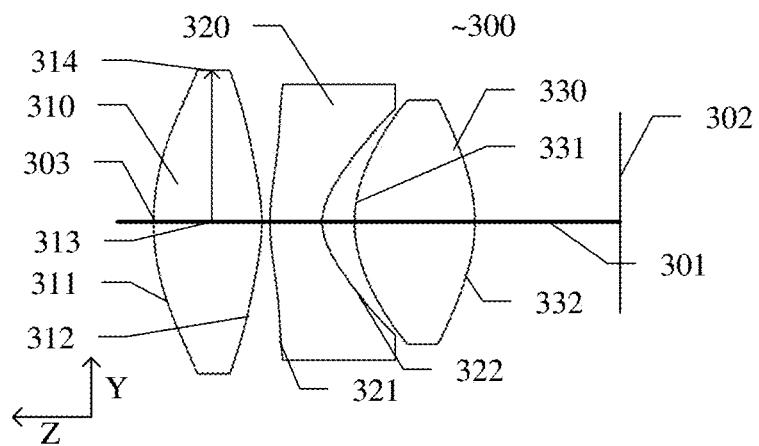
FIG. 1C is a cross-sectional view of an eyepiece system in the optical system shown in FIG. 1A.

At least one embodiment of the present disclosure provides an optical system. FIG. 1A is a schematic partial cross-sectional view of the optical system provided in the embodiments of the present disclosure, FIG. 1B is a schematic cross-sectional view of the optical system shown in FIG. 1A taken along line AA, and FIG. 1C is a cross-sectional view of the eyepiece system in the optical system shown in FIG. 1A. As shown in FIGS. 1A to 1C, the optical system in the embodiments of the present disclosure includes an optical waveguide 100 and an eyepiece system 200. The eyepiece system 200 is located on a light incident side 101 of the optical waveguide 100, and a light exit side 201 of the eyepiece system 200 is opposite to the light incident side 101 of the optical waveguide 100 so that the light exited from the eyepiece system 200 is incident on the optical waveguide 100. The eyepiece system includes a lens group 300, the lens group 300 includes a plurality of lenses, optical axes of the plurality of lenses coincide, the optical axes of the plurality of lenses are an optical axis 301 of the lens group 300, and the optical axis 301 is perpendicular to a surface which is included by the optical waveguide 100 and which is on the light incident side 101 of the optical waveguide 100. The lens group 300 includes a first lens 310, a second lens 320 and a third lens 330 which are sequentially arranged in a direction (e.g., a Z direction) parallel to the optical axis 301 of the lens group 300, a side of the first lens 310 away from the second lens 320 is the light exit side 201 of the eyepiece system 200. Each of the first lens 310 and the third lens 330 has a positive focal power. For example, the first lens 310 and the third lens 330 may be biconvex positive lenses. The second lens 320 has a negative focal power. For example, the second lens 320 may be meniscus negative lens. Compared with the general eyepiece system including the polarizing beam splitter, the eyepiece system including the lens group provided by the embodiments of the disclosure can not only reduce the volume of the eyepiece system to make the structure of the optical system more compact, but also improve the light energy utilization rate and improve the light efficiency, and can also clearly present an image with an image resolution of not less than 5000 PPI after being conducted through the optical waveguide in front of a user by correcting aberration.

The eyepiece system in the embodiments can have the function of eliminating color difference and partial overcorrected aberration (i.e., corrected aberration, and overcorrection is needed because the third lens also has aberration) through the combination structure of the first lens and the second lens.

For example, a material of the first lens and a material of the second lens are different to further eliminate color difference. For example, the material of the first lens can be COP series optical plastic material (E48R) of Zeon, and the material of the second lens can be optical polyester resin (OKP4).

In the process of optimizing parameters of the eyepiece system, the third lens in the eyepiece system plays a role in adjusting a propagation direction of light exited from the first lens and the second lens, i.e. deflecting the light exited from the first lens and the second lens so that a height of an image formed by the light exited from the third lens and formed on an imaging plane is a required height.

For example, a material of the third lens and the material of the first lens may be the same or different.

For example, as shown in FIG. 1C, the first lens 310 includes a first surface 311 and a second surface 312 which are opposite to each other, the second lens 320 includes a third surface 321 and a fourth surface 322 which are opposite to each other, and the third lens 330 includes a fifth surface 331 and a sixth surface 332 which are opposite to each other. The first surface to the sixth surface are sequentially arranged in the direction parallel to the optical axis 301, for example, in the Z direction shown in the figure.

For example, the focal power of the first lens 310 is in a range from 0.01 to 0.2, the focal power of the second lens 320 is in a range from −0.01 to −0.2, and the focal power of the third lens 330 is in a range from 0.05 to 0.3.

For example, the focal power of the first lens 310 is from 0.02 to 0.1, the focal power of the second lens 320 is from −0.05 to −0.2, and the focal power of the third lens 330 is from 0.1 to 0.2.

For example, a focal power of the first surface 311 of the first lens 310 is 0.0385, a focal power of the second surface 312 of the first lens 310 is 0.052, and a total focal power of the first lens 310 is 0.0905; a focal power of the third surface 321 of the second lens 320 is 0.0507, a focal power of the fourth surface 322 of the second lens 320 is −0.2126, and a total focal power of the second lens 320 is −0.1619; a focal power of the fifth surface 331 of the third lens 330 is 0.0754, a focal power of the sixth surface of the third lens 330 is 0.0593, and a total focal power of the third lens 330 is 0.1347. According to the embodiments of the disclosure, the aberration of the eyepiece system is better corrected through reasonable distribution and combination of the focal powers of the respective surfaces of the respective lenses.

For example, as shown in FIG. 1C, a radius of curvature of the first surface 311 ranges from 5 to 50 mm, a radius of curvature of the second surface 312 ranges from −50 to 0 mm, a radius of curvature of the third surface 321 ranges from 0 to 50 mm, a radius of curvature of the fourth surface 322 ranges from 2 to 20 mm, a radius of curvature of the fifth surface 331 ranges from 5 to 20 mm, and a radius of curvature of the sixth surface 332 ranges from −5 to −20 mm.

For example, the radius of curvature of the first surface 311 ranges from 10 to 30 mm, the radius of curvature of the second surface 312 ranges from −20 to 0 mm, the radius of curvature of the third surface 321 ranges from 10 to 30 mm, the radius of curvature of the fourth surface 322 ranges from 2 to 10 mm, the radius of curvature of the fifth surface 331 ranges from 5 to 10 mm, and the radius of curvature of the sixth surface 332 ranges from −5 to −10 mm.

For example, the radius of curvature of the first surface 311 is 13.82 mm, the radius of curvature of the second surface 312 is −10.22 mm, the radius of curvature of the third surface 321 is 12.14 mm, the radius of curvature of the fourth surface 322 is 2.86 mm, the radius of curvature of the fifth surface 331 is 7.04 mm, and the radius of curvature of the sixth surface 332 is −8.96 mm.

For example, the first surface 311, the second surface 312, the third surface 321, the fourth surface 322 and the fifth surface 331 may be even aspheric surfaces (EVENASPH), and the radii of curvature of the above five surfaces are the radii of curvature of base spherical surfaces of their surfaces. The sixth surface 332 may be a spherical surface. The embodiments of the present disclosure schematically show the surface type of each surface, but are not limited thereto. The above-mentioned "base spherical surface" refers to a base spherical surface of the aspheric surface, the aspheric surface is formed by further deformation on the basis of a spherical surface, and the spherical surface serving as the basis of the aspheric surface is the base spherical surface of the aspheric surface.

For example, as shown in FIG. 1C, in the process of optimizing parameters of the eyepiece system, an imaging surface 302 of the eyepiece system is located on a side of the third lens 330 away from the second lens 320, and a distance from an intersection point 303 where the first surface 311 of the first lens 310 away from the second lens 320 intersects the optical axis 301 to the imaging surface 302 is in a range from 10 to 30 mm.

For example, the distance from the intersection point 303 where the first surface 311 of the first lens 310 away from the second lens 320 intersects the optical axis 301 to the imaging surface 302 is from 25 to 30 mm. For example, the distance from the intersection point 303 where the first surface 311 intersects the optical axis 301 to the imaging surface 302 is 24 mm, that is, a total optical path length of the eyepiece system 200 is 24 mm. The imaging surface is a position of an image source in the case that the optical system is used with the display device. The total optical path length of the eyepiece system provided in this embodiment is small, so that the size of the optical system along the optical axis direction of the eyepiece system can be reduced, to improve the compactness of the structure of the optical system.

For example, as shown in FIG. 1C, a size of the lens group 300 in the direction parallel to the optical axis 301 is in a range from 10 to 30 mm, that is, a distance from the intersection point where the first surface 311 intersects the optical axis 301 to an intersection point where the sixth surface 332 intersects the optical axis 301 is from 10 to 30 mm. For example, the distance from the intersection point where the first surface 311 intersects the optical axis 301 to the intersection point where the sixth surface 332 intersects the optical axis 301 is from 10 to 20 mm. For example, a size of the lens group 300 cut by the optical axis 301 is 18 mm.

For example, as shown in FIG. 1C, a size of each of the first lens 310, the second lens 320 and the third lens 330 in the direction parallel to the optical axis 301 ranges from 2 to 20 mm, that is, a thickness of each lens cut by the optical axis 301 is from 2 to 20 mm, that is, a distance between intersection points where two surfaces of the first lens 310 intersect the optical axis 301 is from 2 to 20 mm, a distance between intersection points where two surfaces of the second lens 320 intersect the optical axis 301 is from 2 to 20 mm, and a distance between intersection points where two surfaces of the third lens 330 intersect the optical axis 301 is from 2 to 20 mm. For example, the thickness of each lens cut by the optical axis 301 is from 2 to 10 mm. For example, the thickness of the first lens 310 is 6.2 mm, a distance between the first lens 310 and the second lens 320 along the optical axis 301 is 0.47 mm, the thickness of the second lens 320 is 3 mm, a distance between the second lens 320 and the third lens 330 along the optical axis 301 is 1.85 mm, the thickness of the third lens 330 is 6.9 mm, and a distance between the third lens 330 and the imaging surface 302 along the optical axis 301 is 5.75 mm.

The eyepiece system provided in the embodiment has a small size along its optical axis direction, so that the size of the optical system can be reduced to improve the compactness of the structure of the optical system.

Figure 1D:
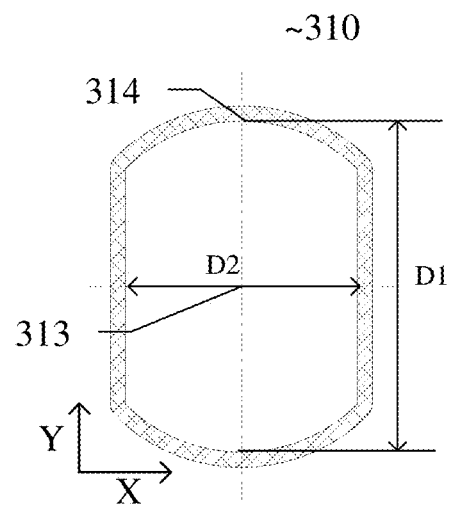
FIG. 1D is a schematic cross-sectional view of a first lens shown in FIG. 1C.

For example, FIG. 1D is a schematic cross-sectional view of the first lens shown in FIG. 1C. As shown in FIGS. 1C and 1D, an orthographic projection of the lens group 300 on a plane perpendicular to the optical axis 301 has the maximum size in a first direction (Y direction); in the first direction, a diameter of each lens is from 10 to 35 mm; in a second direction perpendicular to the first direction, a diameter of each lens is from 5 to 15 mm, and the second direction is perpendicular to the optical axis 301. In the lens group 300, a direction from a center of each lens to a top of the lens is the first direction (Y direction), and the first direction is perpendicular to the optical axis 301. For example, the direction from the center 313 of the first lens 310 to the end 314 of the first lens 313 is the first direction.

For example, the diameter of each lens is from 10 to 20 mm in the first direction, and the diameter of each lens is from 10 to 15 mm in the second direction perpendicular to the first direction.

For example, a diameter D1 of each of the first surface 311 and the second surface 312 of the first lens 310 in the Y direction is 17.4 mm, and a diameter D2 of each of the first surface 311 and the second surface 312 in the X direction is 12.2 mm.

For example, a diameter of the third surface 321 of the second lens 320 in the Y direction is 15.8 mm, and a diameter of the fourth surface 322 in the Y direction is 13 mm. A diameter of each of the fifth surface 331 and the sixth surface 332 of the third lens 330 in the Y direction is 14 mm.

The setting of the above diameters of the lenses in the lens group in the first direction and the second direction can not only ensure the small sizes thereof in the directions perpendicular to the optical axis, but also meet the requirements of the field of view.

For example, in an example of this embodiment, a conic of the first surface 311 of the first lens 310 may be −1.97, a conic of the second surface 312 of the first lens 310 may be −13.68, a conic of the third surface 321 of the second lens 320 may be −11.26, a conic of the fourth surface 322 of the second lens 320 may be −2.18, a conic of the fifth surface 331 of the third lens 330 may be −4.36, and a conic of the sixth surface 332 of the third lens 330 may be −3.45.

For example, the aspheric surface type is expressed by the following numerical formula:

$$Z = \frac{cr^2}{1+\sqrt{1-(1+k)c^2r^2}} + a_1 r^2 + a_2 r^4 + a_3 r^6 + a_4 r^8 + a_5 r^{10}.$$

In the above formula, a height of the aspheric surface in the direction perpendicular to the optical axis is r; a distance between a vertex of the aspheric surface and a projection of a position where the height of the aspheric surface is r on the optical axis is z, that is, a distance along the optical axis from a tangent plane at the vertex of the aspheric surface to the position of the aspheric surface where the height of the aspheric surface is r is z; a curvature is c (reciprocal of the radius of curvature); the conic is k; and the 2n-th order aspheric coefficient is $a_n$ in turn. In optimizing the reasonable configuration of each parameter of the eyepiece system in practice, an optical automatic design software sequentially retrieves values of the radius of curvature, the conic, the height and the aspheric coefficient of each lens and the like in a database and put them into the above numerical formula for calculation to obtain each optimization parameter capable of correcting the aberration of the optical multiple structure. Through the optimization process, optimal values of the above radius of curvature, the thickness along the optical axis, the diameter and the conic of each lens in the eyepiece system are obtained. The aspheric coefficients corresponding to the first surface of the first lens obtained in the optimization process satisfy $a_1=0$, $a_2=1.1929E-004$, $a_3=-6.2790E-008$, $a_4=-4.6564E-008$, $a_5=3.5439E-010$; the aspheric coefficients corresponding to the second surface of the first lens satisfy $a_1=0$, $a_2=2.7939E-004$, $a_3=-9.2809E-006$, $a_4=9.6643E-008$, as $=-3.2173E-010$; the aspheric coefficients corresponding to the third surface of the second lens satisfy $a_1=0$, $a_2=-5.4382E-004$, $a_3=3.3851E-006$, $a_4=8.3376E-008$, as $=-8.3050e-010$; the aspheric coefficients corresponding to the fourth surface of the second lens satisfy $a_1=0$, $a_2=-4.3477E-005$, $a_3=6.9401E-007$, $a_4=1.7360E-007$, as $=-2.7186e-009$; the aspheric coefficients corresponding to the fifth surface of the third lens satisfy $a_1=0$, $a_2=6.8044E-004$, $a_3=-1.4767E-005$, $a_4=2.2080E-007$, as $=-1.4285E-009$. Because the sixth surface of the third lens is a spherical surface or a conical surface, the aspheric coefficients of the third lens satisfy $a_1=a_2=a_3=a_4=a_5=0$.

For example, in an example of this embodiment, wavelengths of light transmitted through the lens group may include 0.486133 μm, 0.587562 μm, or 0.656273 μm; an effective focal length of the lens group may be from 10 to 25 mm, for example, may be 15.13 mm; a back focal length of the lens group may be 5.76 mm, that is, a distance from the sixth surface of the third lens to the imaging surface is 5.76 mm; a paraxial image height formed by the lens group can be 2.3 mm, that is, a radius of a paraxial image at a paraxial imaging plane is 2.3 mm; an entrance pupil diameter of the lens group is 5 mm; the maximum field of view of the lens group in the second direction (X direction) is 15.7°, and the maximum field of view in the first direction (Y direction) is 8.66°. The entrance pupil diameter of the above lens group can be regarded as a diameter of an aperture stop 401 shown in FIGS. 1A and 1B. The aperture stop in this embodiment can be not an actual structure, but is designed to have a diaphragm diameter serving as an exit pupil diameter of the lens group (used as the entrance pupil diameter in the optimization process).

Figure 2:
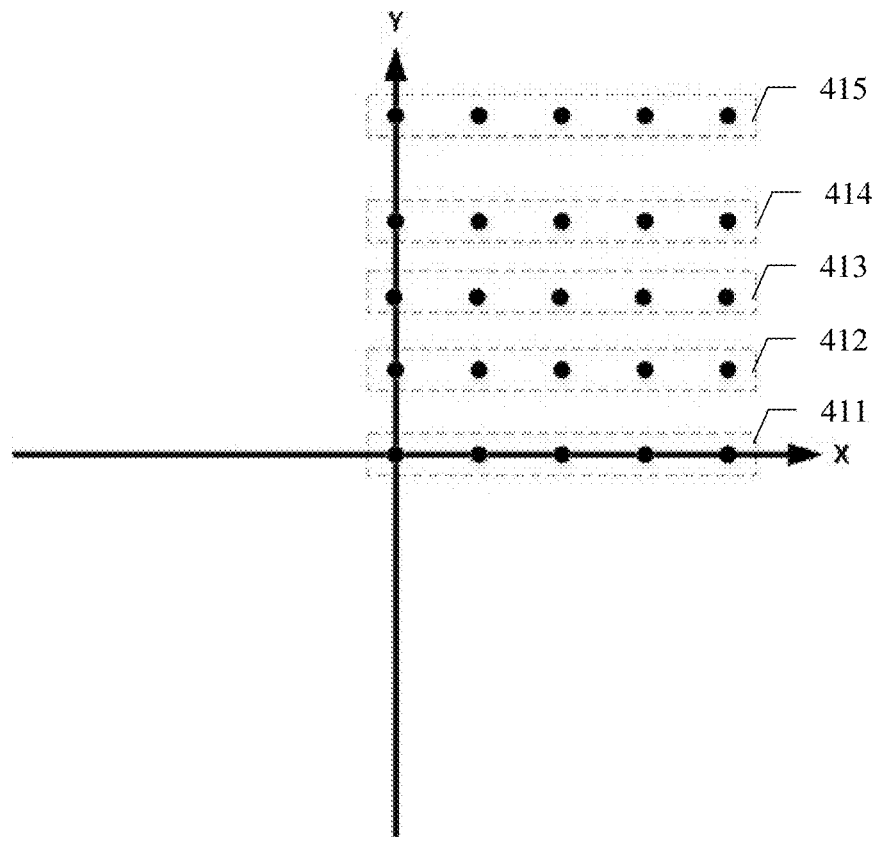
FIG. 2 is a field view of a multiple structure corresponding to the eyepiece system provided by an example of an embodiment of the present disclosure.

FIG. 2 is a view of a multiple structure corresponding to the eyepiece system provided by an example of an embodiment of the present disclosure. As shown in FIG. 1A, FIG. 1B and FIG. 2, this example schematically shows that the multiple structure is a quintuple-structure including five structures 411-415, and the five structures 411-415 are arranged along the Y direction. The five structures refer to that: in a positive direction (or a negative direction) pointing to the Y direction from the origin of the lens group, the lens group is divided into five regions, a field of view angle of light incident on a first region (a first structure 411) is 0°, a field of view angle of light incident on a second region (a second structure 412) is 2.6°, a field of view angle of light incident on a third region (a third structure 413) is 4.33°, and a field of view angle of light incident on a fourth region (a fourth structure 414) is 6.122°, and a field of view angle of light incident on a fifth region (a fifth structure) is 8.659°. FIG. 1B shows the first structure and the fifth structure in the quintuple-structure, i.e., the regions where the first structure and the fifth structure are located.

For example, the origin in the XY coordinate system as shown in FIG. 2 corresponds to the center which the optical axis of the lens group passes through, and the five structures 411-415 are also five regions arranged in the Y direction and on one side of the center of the lens group 300.

For example, positions of the field of view of the five structures are as follows: a half field of view angle of the first structure 411 along the Y direction is 0°, and half field of view angles of the first structure 411 along the X direction are 0°, 4.712°, 7.854°, 11.106°, 15.708°, respectively; a half field of view angle of the second structure 412 along the Y direction is 2.6°, and half field of view angles of the second structure 412 along the X direction are 0°, 4.712°, 7.854°, 11.106°, 15.708° respectively; a half field of view angle of the third structure 413 along the Y direction is 4.33°, and half field of view angles of the third structure 413 along the X direction are 4.712°, 7.854°, 11.106°, 15.708° respectively; a half field of view angle of the fourth structure 414 along the Y direction is 6.122°, and half field of view angles of the fourth structure 414 along the X direction are 0°, 4.712°, 7.854°, 11.106°, 15.708° respectively; a half field of view angle of the fifth structure 415 along the Y direction is 8.659°, and half field of view angles of the fifth structure 415 along the X direction are 0°, 4.712°, 7.854°, 11.106°, 15.708° respectively.

For example, as shown in FIGS. 1A and 1B, in the X direction, one aperture stop 401 (or one of the aperture stop 402 to the aperture stop 405) is provided on a side of the eyepiece system 200 facing the optical waveguide 100 and an exit pupil diameter of the light exited from the eyepiece system 200 at a position corresponding to the aperture stop is equal to an exit pupil diameter of the light exited from the optical waveguide 100 at an exit pupil position 202 where the user's eyes are located. In the Y direction, the side of the eyepiece system 200 facing the optical waveguide 100 is provided with a plurality of aperture stops corresponding to the multiple structure, the number of the structures included by the multiple structure is the same as the number of the aperture stops. Light exited from each structure of the eyepiece system 200 (i.e., each of the five light exit regions of the eyepiece system 200) enters the optical waveguide 100 after passing through one aperture stop. In the Y direction, the exit pupil diameter of the light exited from each structure of the eyepiece system 200 at the position corresponding to one aperture stop is equal to the exit pupil diameter of the light exited from the optical waveguide 100 at the exit pupil position 202 where the user's eyes are located.

For example, abscissas of centers of the aperture stops corresponding to the five structures in the coordinate system shown in FIG. 2 are 0, and ordinates of the centers of the aperture stops corresponding to the five structures in the coordinate system shown in FIG. 2 are 0, 1.737, 2.895, 4.097 and 5.807 respectively.

For example, as shown in FIGS. 1A and 1B, the optical waveguide 100 includes a main plane 104, and the optical waveguide 100 includes two opposite main planes, for example, two planes perpendicular to the Z direction. The optical waveguide 100 includes a reflection array 103 arranged in the second direction (X direction), and a first reflecting surface 102 corresponding to the light incident side 101. Both the light incident side 101 and the light exit side 105 of the optical waveguide 100 are located on the same side of the main plane 104, i.e., the light incident from the main plane 104 of the optical waveguide 100 is first reflected by the first reflecting surface 102, then is propagated in a total reflection manner in the optical waveguide 100, and then is reflected by the reflection array 103 to exit from the main plane 104. The reflection array 103 is configured to reflect the light entering the optical waveguide 100 from the light incident side 101 to the light exit side 105 such that a size of a light beam exited from the optical system in the second direction is larger than a size of a light beam exited from the eyepiece system 200 in the second direction.

For example, as shown in FIG. 1A, in the second direction, three light beams incident on the eyepiece system 200 (incident on one structure of the above multiple structure) are collimated by the eyepiece system 200 and then exited to the optical waveguide 100. After passing through the reflection array 103, each light beam incident on the optical waveguide 100 is expanded to increase the field of view in the second direction. Thus, in the case that the optical system is used in a near-eye device, the field of view parallel to the direction of the connecting line of two eyes of the user is increased.

For example, as shown in FIG. 1B, in the first direction, three light beams (respectively located in each structure of the multiple structure) incident on the eyepiece system 200 are collimated by the eyepiece system 200 and then exited to the optical waveguide 100. Because the plurality of light beams arranged in the first direction are not reflected and expanded by the reflection array, and the plurality of light beams converge to the exit pupil position 202 of the optical waveguide 100 after passing through the optical waveguide 100, the size of each light beam exited from the eyepiece system 200 is the same as that of the light beam exited from the optical waveguide 100.

According to the embodiments of the disclosure, aberration can be corrected by optimizing various parameters of the plurality of lenses in the eyepiece system, so that complex requirements of the optical multiple structure can be met, and the exit pupil is expanded in the second direction without expanding in the first direction, so that image quality clarity in the first direction and the second direction is ensured.

Figure 3A:
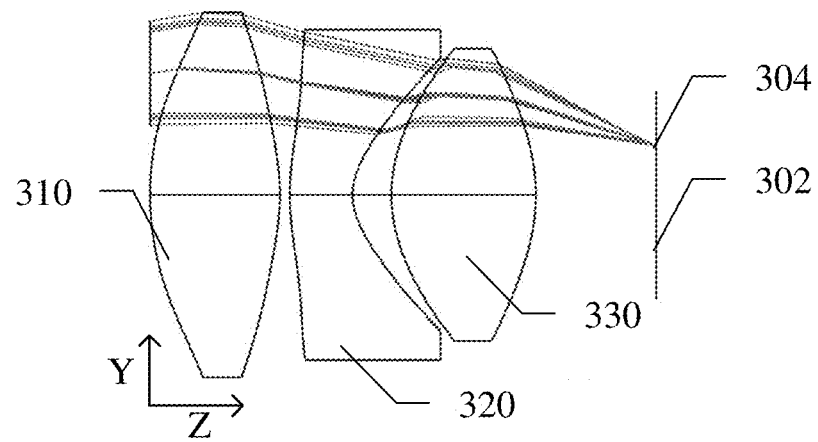
FIG. 3A is a schematic light path diagram of the eyepiece system shown in FIG. 1C.
Figure 3B:
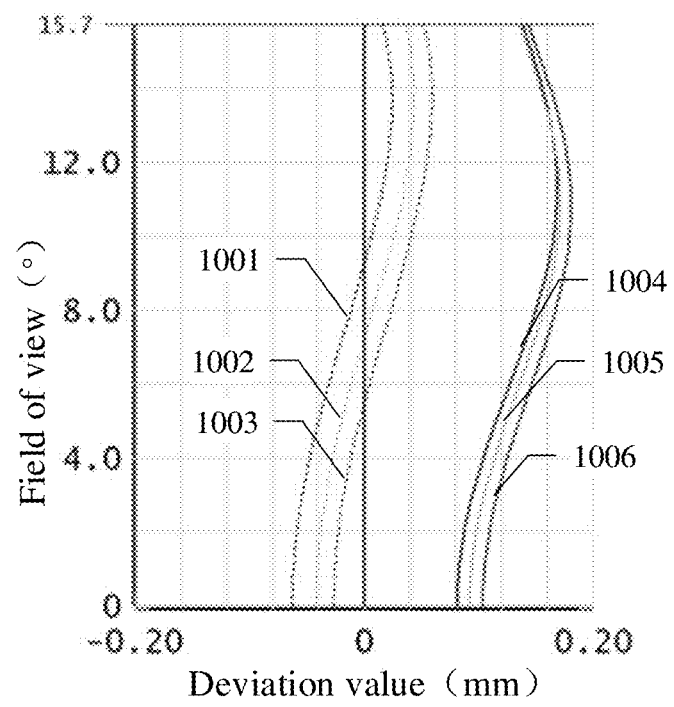
FIG. 3B and FIG. 3D are field curvature aberration diagrams of the eyepiece system shown in FIG. 3A in different directions.

FIG. 3A is a schematic light path diagram of the eyepiece system shown in FIG. 1C. As shown in FIG. 3A, in the process of optimizing the parameters of the eyepiece system, light incident from a side of the first lens 310 of the eyepiece system away from the second lens 320 presents a light spot 304 on the imaging surface 302. In the case that the eyepiece system is used with a display device, the imaging surface 302 is an image source, and the light spot 304 is a pixel on the image source 302. FIG. 3B and FIG. 3D are field curvature aberration diagrams of the eyepiece system shown in FIG. 3A in different directions, and FIG. 3C and FIG. 3E are distortion aberration diagrams of the eyepiece system shown in FIG. 3A in different directions.

As shown in FIG. 3B, deviation values of a meridian 1001 of blue light (wavelength 0.4861 mm), a sagittal line 1004 of the blue light, a meridian 1002 of green light (wavelength 0.5876 mm), a sagittal line 1005 of the green light, a meridian 1003 of red light (wavelength 0.6563 mm), and a sagittal line 1006 of the red light in different fields of view distributed in the second direction are shown. In the maximum field of view (15.7°), the maximum field curvature of the eyepiece system is not greater than 0.2 mm, and thus the field curvature aberration in the embodiments of the present disclosure is well corrected. The deviation value refers to a distance between the imaging plane in the case that the field curvature occurs and the imaging plane in the case that the field curvature does not occur, and the maximum field curvature refers to the maximum distance between the imaging plane in the case that the field curvature occurs and the imaging plane in the case that the field curvature does not occur.

Figure 3C:
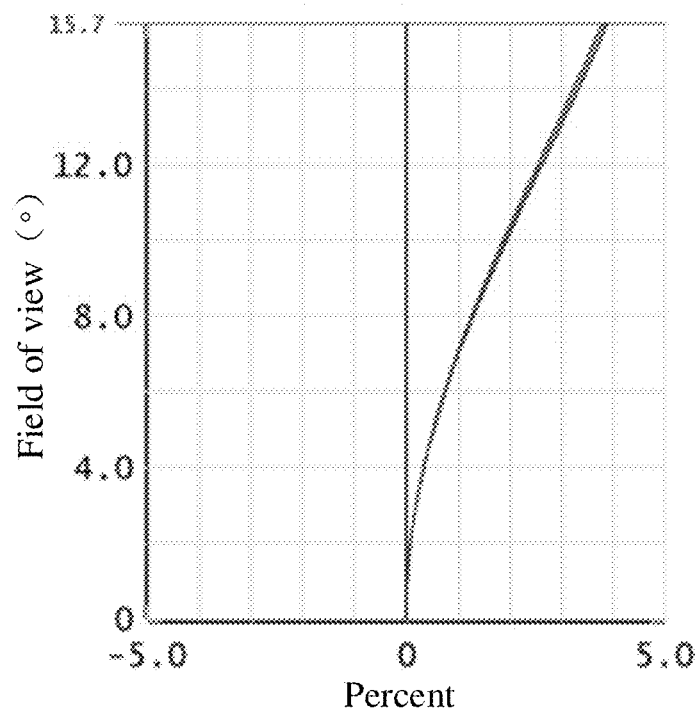
FIG. 3C and FIG. 3E are distortion aberration diagrams of the eyepiece system shown in FIG. 3A in different directions.
Figure 3D:
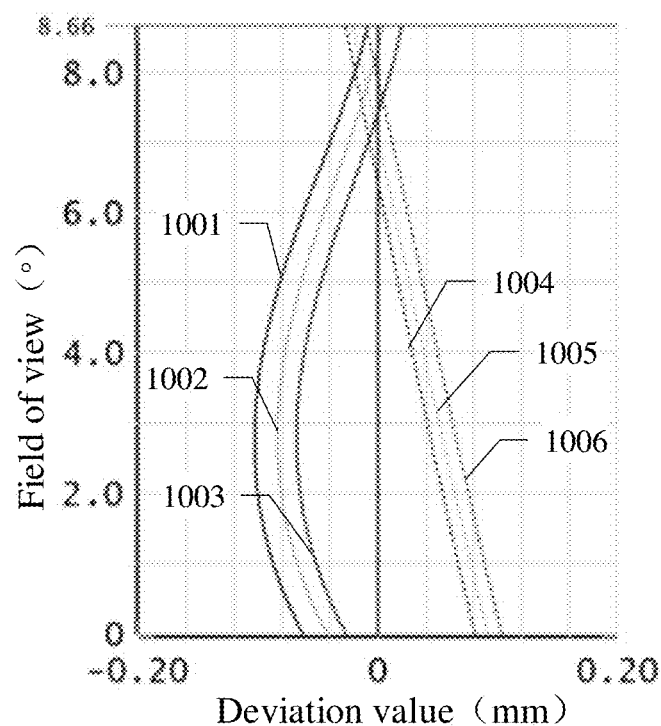
Figure 3E:
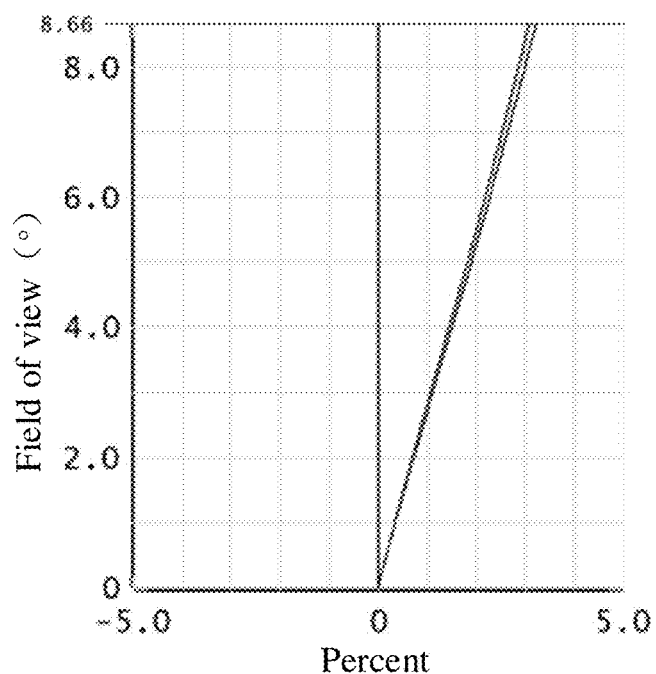

FIG. 3C shows distortion degrees of the blue light, the green light and the red light in different fields of view distributed along the second direction, the distortion degrees of the three are basically the same, so the three curves almost coincide. As shown in FIG. 3C, in the maximum field of view in the second direction, the maximum distortion of the eyepiece system is less than 4%.

As shown in FIG. 3D, deviation values of the meridian 1001 of the blue light, the sagittal line 1004 of the blue light, the meridian 1002 of the green light, the sagittal line 1005 of the green light, the meridian 1003 of the red light, and the sagittal line 1006 of the red light in different fields of view distributed in the first direction are shown. In the maximum field of view (8.66°), the maximum field curvature of the eyepiece system is not greater than 0.1 mm.

FIG. 3E shows the distortion degrees of the blue light, the green light and the red light in different fields of view in the first direction, the distortion degrees of the three are basically the same, so the three curves almost coincide. As shown in FIG. 3C, in the maximum field of view in the first direction, the maximum distortion of the eyepiece system is less than 4%.

Figure 4:
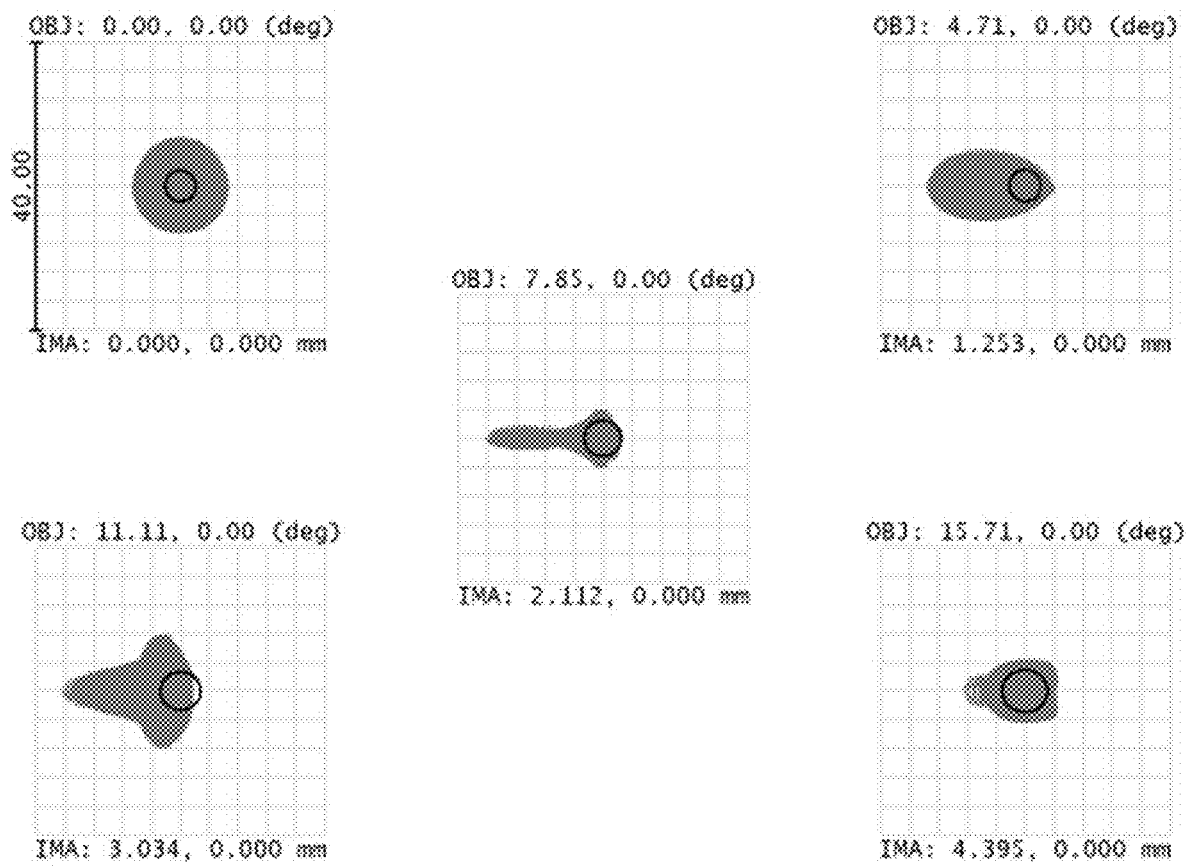
FIG. 4 is a spot diagram of the eyepiece system according to an embodiment of the present disclosure.

FIG. 4 is a spot diagram of the eyepiece system provided by an embodiment of the disclosure. The spot diagram shown in FIG. 4 is the most intuitive and comprehensive expression of the image quality of the system. The position of the light spot does not need to be considered. The distortion ratio is 10 times that of the Airy spot, which is not recognized by human eyes. The Airy spot is shown as a black circle in the diagram. FIG. 4 shows the light spots of the red light, green light and blue light in the first structure of the above-mentioned five structures. As shown in FIG. 4, the five light spots are distributed in different fields of view in the second direction. The radius of the light spot located at the origin of the imaging plane is the smallest, has the minimum root mean square radius of 3.635 μm, the geometric radius of 6.112 μm, and has no color difference; in the case that the fields of view where the light spots are located gradually increase, the light spots sequentially have the minimum root mean square radii of 4.675 μm, 5.398 μm, 6.041 μm and 3.171 μm, and sequentially have the geometric radii of 12.999 μm, 15.644 μm, 15.898 μm and 8.057 μm.

Figure 5A:
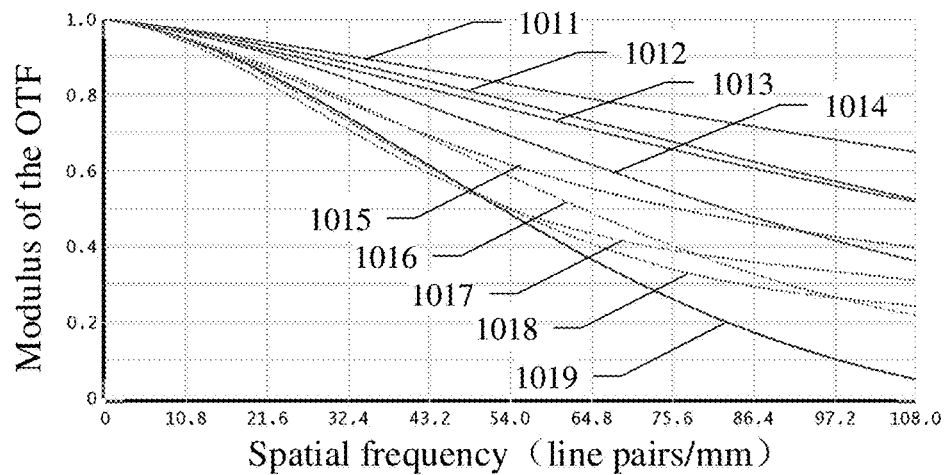
FIGS. 5A-5E are modulation transfer function curve diagrams corresponding to five structures of a multiple structure respectively.
Figure 5B:
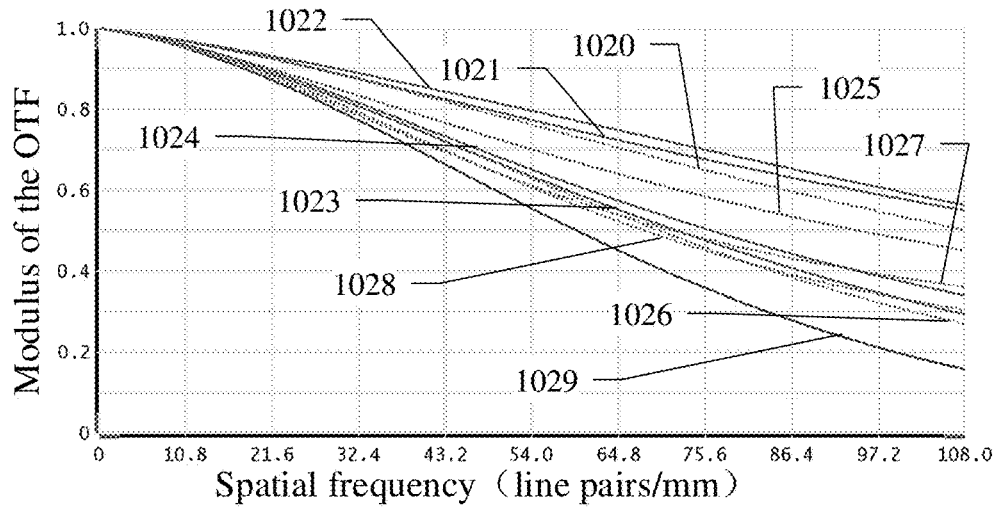
Figure 5C:
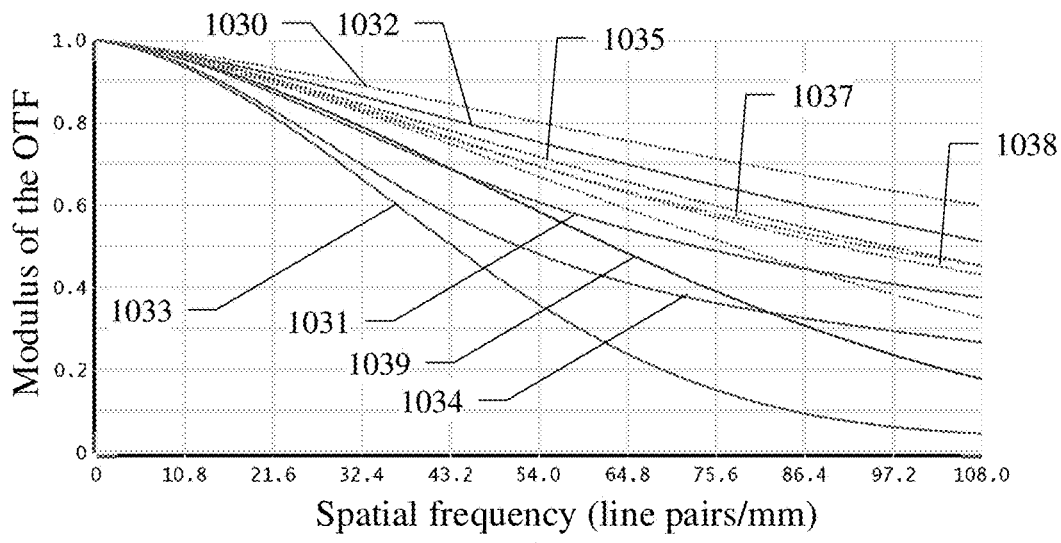
Figure 5D:
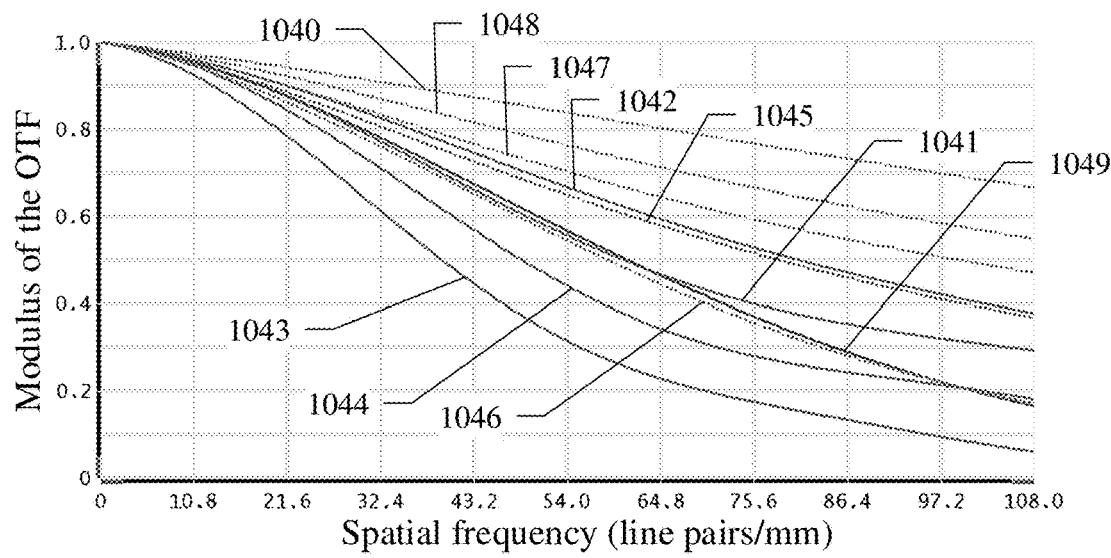
Figure 5E:
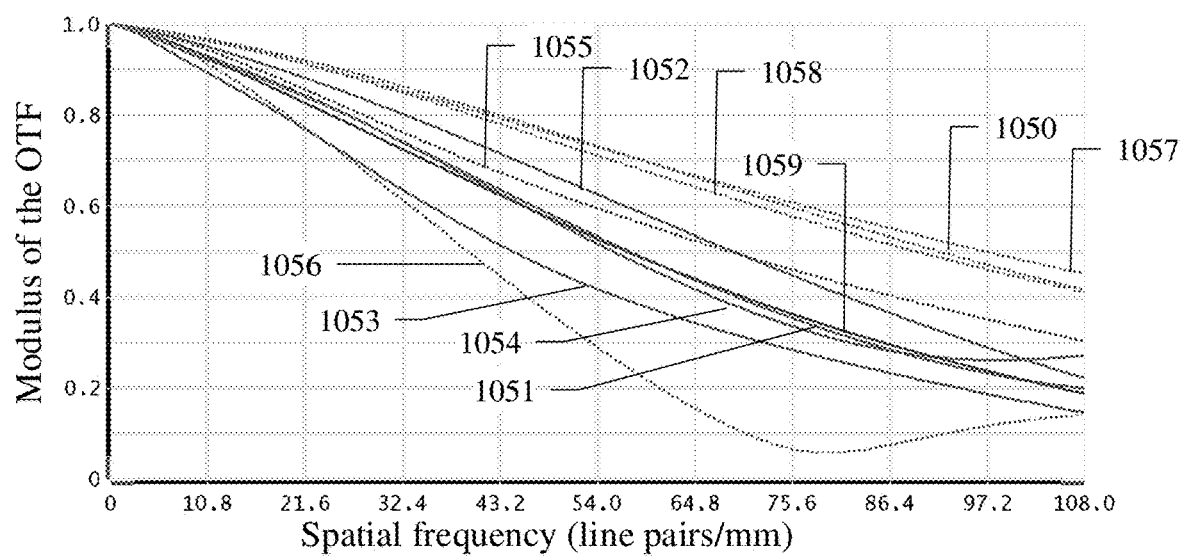

FIGS. 5A-5E are modulation transfer function curve diagrams corresponding to the five structures respectively. FIG. 5A is a modulation transfer function graph of the first structure 411 shown in FIG. 2, FIG. 5B is a modulation transfer function graph of the second structure 412 shown in FIG. 2, FIG. 5C is a modulation transfer function graph of the third structure 413 shown in FIG. 2, FIG. 5D is a modulation transfer function graph of the fourth structure 414 shown in FIG. 2, and FIG. 5E is a modulation transfer function graph of the fifth structure 415 shown in FIG. 2. FIG. 5A shows the optical transfer function values of meridian lines 1011, 1012, 1013, 1014, 1019 (shown by solid lines in the figure) and sagittal lines 1015, 1016, 1017, 1018, 1010 (shown by dashed lines in the figure) located in different fields of view in the first structure at different spatial frequencies. FIG. 5B shows the optical transfer function values of meridian lines 1021, 1022, 1023, 1024, 1029 (shown by solid lines in the figure) and sagittal lines 1025, 1026, 1027, 1028, 1020 (shown by dashed lines in the figure) located in different fields of view in the second structure at different spatial frequencies. FIG. 5C shows the optical transfer function values of meridian lines 1031, 1032, 1033, 1034, 1039 (shown by solid lines in the figure) and sagittal lines 1035, 1036, 1037, 1038, 1030 (shown by dashed lines in the figure) located in different fields of view in the third structure at different spatial frequencies. FIG. 5D shows the optical transfer function values of meridian lines 1041, 1042, 1043, 1044, 1049 (shown by solid lines in the figure) and sagittal lines 1045, 1046, 1047, 1048, 1040 (shown by dashed lines in the figure) located in different fields of view in the fourth structure at different spatial frequencies. FIG. 5E shows the optical transfer function values of meridian lines 1051, 1052, 1053, 1054, 1059 (shown by solid lines in the figure) and sagittal lines 1055, 1056, 1057, 1058, 1050 (shown by dashed lines in the figure) located in different fields of view in the fifth structure at different spatial frequencies. As shown in FIGS. 5A to 5E, a contrast ratio (i.e., the acutance shown in the figure) at the position where the spatial frequency in the modulation transfer function curve of the eyepiece system is 108p/mm (line pairs/mm) is not less than 0.05, so that the resolution of the image exited from the above optical system can be made as high as possible. The setting of the value of the contrast ratio at the position where the spatial frequency is 108p/mm (line pairs/mm) in the modulation transfer function curve of the eyepiece system provided by the embodiments of the present disclosure also needs to consider the optimization process of the parameters of each lens in the eyepiece system. For example, the contrast ratio at the position where the spatial frequency is 108p/mm (line pairs/mm) (i.e., the acutance shown in the figure) is not greater than 1.

For example, in the case that the optical system provided by the embodiments of the present disclosure is used in a near-eye display device, the display screen used to present a display image satisfies the spatial frequency of 108p/mm in the above modulation transfer function curve. In the embodiments of the disclosure, by correcting the aberration, an image with an image resolution of not less than 5000 PPI is clearly presented in front of the user after being conducted through the optical waveguide.

For example, the eyepiece system in the embodiments of the present disclosure is not limited to the lens group including three lenses, or one or more lenses may be added on the side of the first lens away from the second lens or on the side of the third lens away from the second lens.

For example, the surface of the lens may be formed by a spherical surface or a flat surface, or may be formed by an aspheric surface. In the case that the lens surface is the spherical surface or the flat surface, lens processing and assembly adjustment become easy, and optical performance degradation due to processing and assembly adjustment errors can be prevented.

For example, in the case that the surface of the lens is the aspheric surface, the aspheric surface may be formed by grinding or machining, and a glass mold for forming a glass into an aspheric shape via the mold may be one selected from the group consisting of an aspheric surface and a composite aspheric surface for forming a resin into an aspheric shape on a surface of the glass.

For example, in order to reduce halo and double image, increase transmittance and light efficiency, and achieve high contrast optical performance, each lens surface can also be coated with an antireflection film with high transmittance in a wide wavelength range. According to this, halo and double image can be reduced and high optical performance with high contrast can be achieved.

Figure 6A:
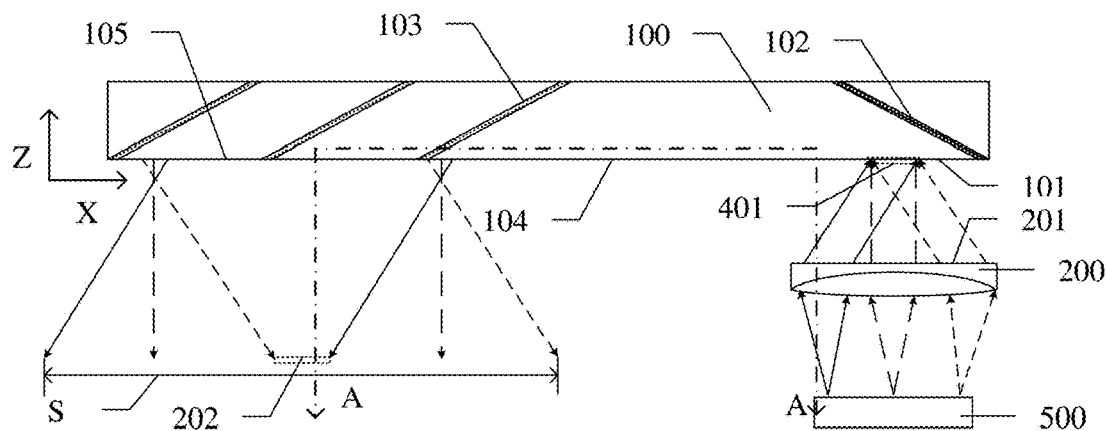
FIGS. 6A-6B are schematic diagrams of a near-eye display device according to another embodiment of the present disclosure.
Figure 6B:
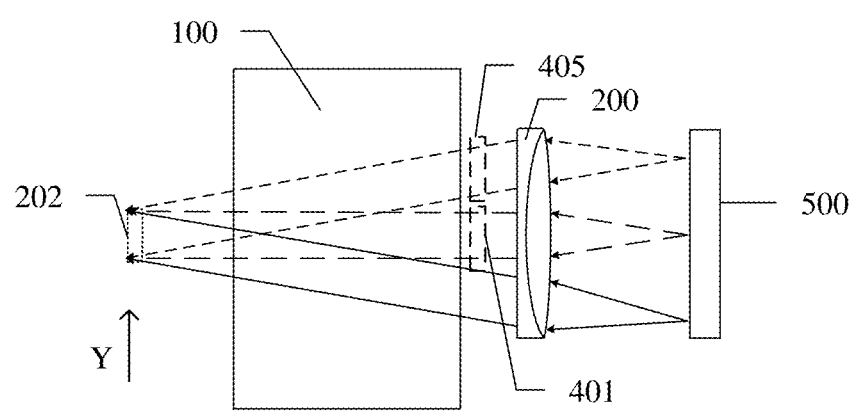

FIGS. 6A-6B are schematic diagrams of a near-eye display device according to another embodiment of the present disclosure. As shown in FIGS. 6A and 6B, the near-eye display device includes a display screen 500 and the optical system provided in any one of the above embodiments, and the display screen 500 is located at the focal plane on the light incident side of the eyepiece system 200.

For example, the display screen 500 displays an image with resolution of not less than 5000 PPI.

For example, the display screen 500 may be any type of display device such as an LCD display device, an organic light emitting diode (OLED) display device, an inorganic light emitting diode display device, a projector (e.g., LCOS micro projector), or the like. For example, the projector device may be a light scanner array. The light scanner array may include a plurality of independent fiber scanners.

For example, the optical waveguide 100 may be a geometric optical waveguide or a holographic optical waveguide. In the case that the near-eye display device using the geometric optical waveguide is used as an augmented reality device, it has the advantages of light weight, small volume and thinness (for example, the thickness can be less than 2 mm), which makes it get wide attention. The high-resolution image displayed by the display screen 500 in the near-eye display device is coupled into the optical waveguide 100, then coupled out of the optical waveguide 100 after total internal reflection (TIR) performed by a partial mirror array (PRMA), and finally transferred into the user's eye. At this time, the user can also see the external real environment through the optical waveguide 100, thus realizing the display effect of augmented reality.

For example, the near-eye display device may be a wearable AR helmet, AR glasses, or the like. The embodiments are not limited thereto.

The eyepiece system in the near-eye display device provided by the embodiments of the disclosure has a high light energy utilization rate and a small volume, so that the optical system can improve the light efficiency, an image with an image resolution of not less than 5000 PPI can be clearly displayed in front of a user after being conducted through the optical waveguide by correcting aberration, and the requirement of compact structure of the near-eye display device as a head-mounted display device is met.

The following points need to be explained:

(1) In the drawings of the embodiments of the present disclosure, only the structures related to the embodiments of the present disclosure are involved, and other structures may refer to common designs.

(2) In case of no conflict, features in the same embodiment and different embodiments of the present disclosure may be combined with each other.

What are described above is related to the illustrative embodiments of the disclosure only and not limitative to the scope of the disclosure, the scopes of the disclosure are defined by the accompanying claims.

What is claimed is:

1. An optical system, comprising:
   an optical waveguide; and
   an eyepiece system at alight incident side of the optical waveguide, a light exit side of the eyepiece system being opposite to the light incident side of the optical waveguide so that light exited from the eyepiece system is incident on the optical waveguide,
   wherein the eyepiece system comprises a lens group, the lens group comprises a first lens, a second lens, and a third lens which are sequentially arranged along a direction parallel to an optical axis of the lens group, a side of the first lens away from the second lens is the light exit side of the eyepiece system, each of the first lens and the third lens has a positive focal power, and the second lens has a negative focal power,
   wherein the first lens comprises a first surface and a second surface which are opposite to each other, the second lens comprises a third surface and a fourth surface which are opposite to each other, and the third lens comprises a fifth surface and a sixth surface which are opposite to each other, the first surface, the second surface, the third surface, the fourth surface, the fifth surface, and the sixth surface are sequentially arranged in the direction parallel to the optical axis, a radius of curvature of the first surface ranges from 5 mm to 50 mm, a radius of curvature of the second surface ranges from −50 mm to 0 mm, a radius of curvature of the third surface ranges from 0 mm to 50 mm, a radius of curvature of the fourth surface ranges from 2 mm to 20 mm, a radius of curvature of the fifth surface ranges from 5 mm to 20 mm, and a radius of curvature of the sixth surface ranges from −5 mm to −20 mm.

2. The optical system according to claim 1, wherein a distance from an intersection point where the first surface intersects the optical axis to an intersection point where the sixth surface intersects the optical axis is in a range from 10 mm to 30 mm.

3. The optical system according to claim 2, wherein each of the first lens, the second lens, and the third lens has a thickness in a range from 2 mm to 20 mm.

4. The optical system according to claim 1, wherein a focal power of the first lens is in a range from 0.01 to 0.2, a focal power of the second lens is in a range from −0.01 to −0.2, and a focal power of the third lens is in a range from 0.05 to 0.3.

5. The optical system according to claim 1, wherein an effective focal length of the eyepiece system is in a range from 10 mm to 25 mm.

6. The optical system according to claim 1, wherein a contrast ratio at a position where a spatial frequency in a modulation transfer function curve of the eyepiece system is 108 line pairs/mm is not less than 0.05.

7. The optical system according to claim 1, wherein an orthographic projection of the lens group on a plane perpendicular to the optical axis has a maximum size in a first direction;
in the first direction, a diameter of each lens is in a range from 10 mm to 35 mm; and in a second direction perpendicular to the first direction, a diameter of each lens is in a range from 5 mm to 15 mm, and both the first direction and the second direction are perpendicular to the optical axis.

8. The optical system according to claim 7, wherein a maximum field curvature of the eyepiece system is not greater than 0.2 mm in a maximum field of view along the first direction and a maximum field of view along the second direction.

9. The optical system according to claim 7, wherein a maximum distortion of the eyepiece system is less than 4% in a maximum field of view along the first direction and a maximum field of view along the second direction.

10. The optical system according to claim 8, wherein the maximum field curvature of the eyepiece system is not greater than 0.1 mm in the maximum field of view along the first direction.

11. The optical system according to claim 7, wherein maximum field of view of the lens group along the first direction is 8.66; and a maximum field of view of the lens group along the second direction is 15.7°.

12. The optical system according to claim 7, wherein the optical waveguide comprises a main plane, both the light incident side of the optical waveguide and a light exit side of the optical waveguide are on a same side of the main plane, the optical waveguide comprises a reflection array arranged along the second direction, and the optical waveguide is configured to reflect light incident into the optical waveguide from the light incident side of the optical waveguide to the light exit side of the optical waveguide, and to make a size, in the second direction, of a light beam exited from the optical waveguide larger than a size, in the second direction, of a light beam exited from the eyepiece system.

13. The optical system according to claim 1, wherein a material of the first lens is different from that of the second lens.

14. A near-eye display device, comprising a display screen and the optical system according to claim 1, wherein the display screen is at a focal plane of a light incident side of the eyepiece system.

15. The near-eye display device according to claim 14, wherein the display screen has an image resolution of not less than 5000 PPI.

16. An optical system, comprising:
an optical waveguide; and
an eyepiece system at a light incident side of the optical waveguide, a light exit side of the eyepiece system being opposite to the light incident side of the optical waveguide so that light exited from the eyepiece system is incident on the optical waveguide,
wherein the eyepiece system comprises a lens group, the lens group comprises a first lens, a second lens, and a third lens which are sequentially arranged along a direction parallel to an optical axis of the lens group, a side of the first lens away from the second lens is the light exit side of the eyepiece system, each of the first lens and the third lens has a positive focal power, and the second lens has a negative focal power,
a focal power of the first lens is in a range from 0.01 to 0.2, a focal power of the second lens is in a range from −0.01 to −0.2, and a focal power of the third lens is in a range from 0.05 to 0.3.

17. The optical system according to claim 16, wherein an orthographic projection of the lens group on a plane perpendicular to the optical axis has a maximum size in a first direction;
in the first direction, a diameter of each lens is in a range from 10 mm to 35 mm; and in a second direction perpendicular to the first direction, a diameter of each lens is in a range from 5 mm to 15 mm, and both the first direction and the second direction are perpendicular to the optical axis.

18. A near-eye display device, comprising a display screen and the optical system according to claim 16, wherein the display screen is at a focal plane of a light incident side of the eyepiece system.

19. An optical system, comprising:
an optical waveguide; and
an eyepiece system at a light incident side of the optical waveguide, a light exit side of the eyepiece system being opposite to the light incident side of the optical waveguide so that light exited from the eyepiece system is incident on the optical waveguide,
wherein the eyepiece system comprises a lens group, the lens group comprises a first lens, a second lens, and a third lens which are sequentially arranged along a direction parallel to an optical axis of the lens group, a side of the first lens away from the second lens is the light exit side of the eyepiece system, each of the first lens and the third lens has a positive focal power, and the second lens has a negative focal power;
an orthographic projection of the lens group on a plane perpendicular to the optical axis has a maximum size in a first direction;
in the first direction, a diameter of each lens is in a range from 10 mm to 35 mm; and in a second direction perpendicular to the first direction, a diameter of each lens is in a range from 5 mm to 15 mm, and both the first direction and the second direction are perpendicular to the optical axis.

20. A near-eye display device, comprising a display screen and the optical system according to claim 19, wherein the display screen is at a focal plane of a light incident side of the eyepiece system.

* * * * *